2 Sheets—Sheet 1.
E. J. HALE.
Lamp Burner.
No. 20,641.
Patented June 22, 1858.
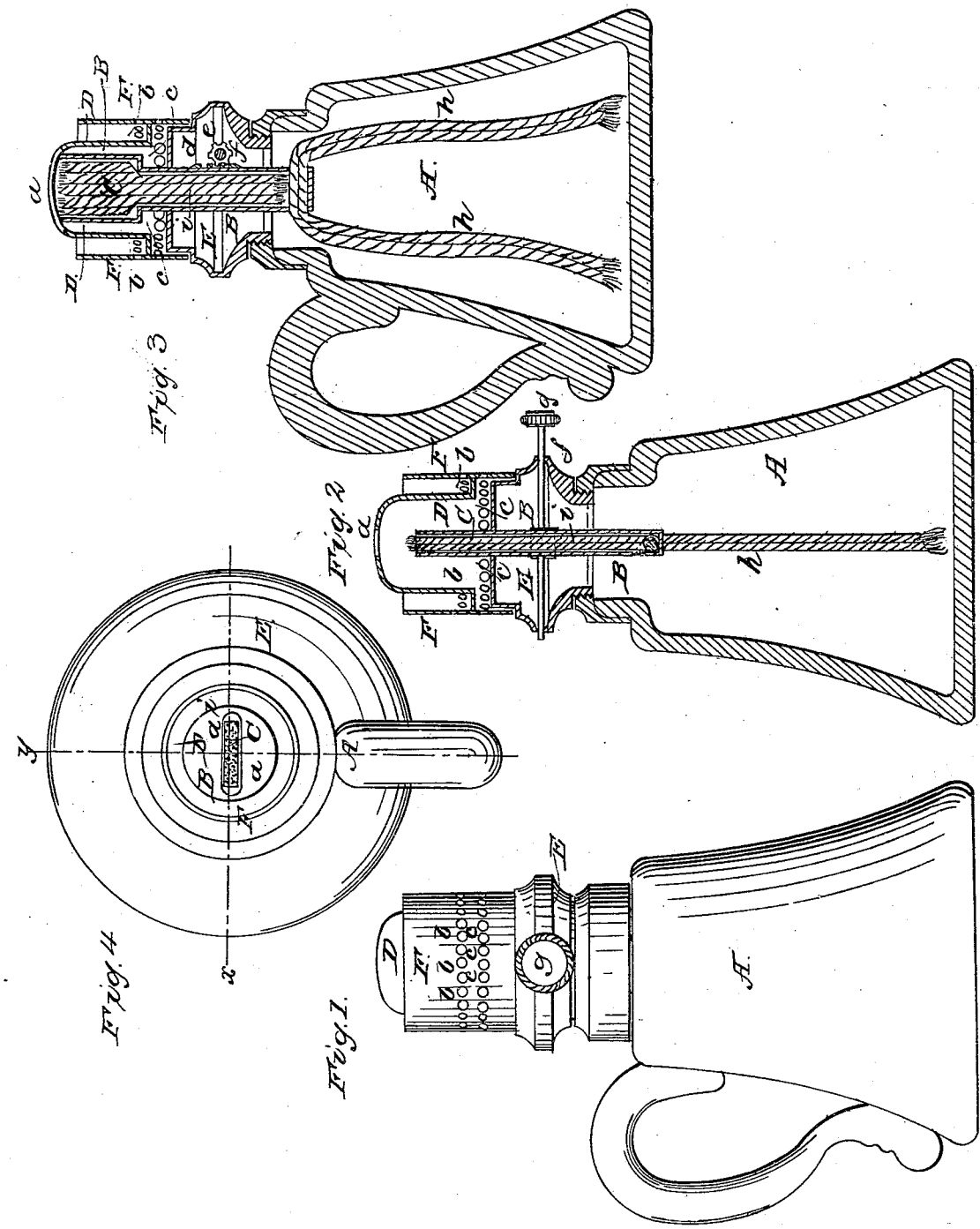

E. J. HALE.
Lamp Burner.
No. 20,641.
2 Sheets—Sheet 2.
Patented June 22, 1858.
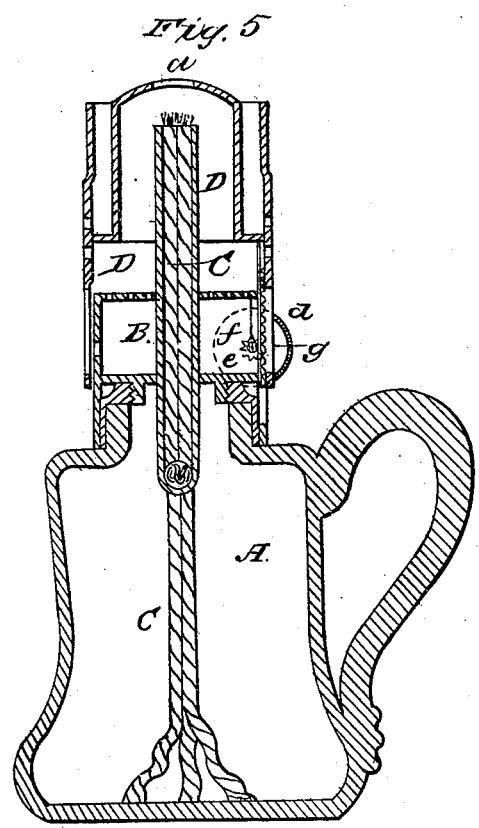

UNITED STATES PATENT OFFICE.

ELIAS J. HALE, OF FOXCROFT, MAINE.

CAMPHENE-LAMP.

Specification of Letters Patent No. 20,641, dated June 22, 1858.

*To all whom it may concern:*

Be it known that I, ELIAS J. HALE, of Foxcroft, of the county of Piscataquis and State of Maine, have invented an Improved Lamp for Burning Camphena or other Hydrocarbon Liquid Rich in Carbon; and I do hereby declare that the same is fully described and represented in the following specification and the accompanying drawings, of which—

Figure 1, is a side elevation. Figs. 2, and 3, are central and vertical sections (taken on lines $x$, $y$, of Fig. 4) and Fig. 4, is a top view of the lamp.

The nature of the said invention consists in an improvement, whereby the wick tube of the lamp is not only made stationary with respect to that part of the wick contained in it, but adjustable with respect to a solar or air cap, or what is the same, the said solar cap is made adjustable with respect to a wick tube stationary in its relation to the wick that may be within it, the adjustment being such as to cause the distance between the top of the wick tube and the orifice in the upper part of the solar cap to be either increased or diminished to such extent as may be desirable in order to prevent the blaze on the wick from smoking and to increase the light from the said blaze.

In lamps as heretofore constructed, the wick tube has been made stationary, the wick being movable so as to be made to extend above the upper end of the wick tube more or less in order to increase or diminish the height of the flame or for other purposes.

In carrying out my invention, the wick is cut off even or about even with the upper end of the wick tube, and is stationary in the said tube or moves only when the tube itself is moved, the tube being made adjustable vertically.

In the drawings, A, denotes the body or reservoir of the lamp; B, the wick tube; C, the wick; D, a solar cap arranged around that part of the wick tube which projects above the screw cap E. This solar cap D, is provided with an elongated orifice or slot $a$, in its upper part, the said cap being made in a form like a bell or a sewing thimble and secured to and within a tube F, which is fixed to the cap E, by a bayonet connection or by any other suitable means. The tube F, contains two series or ranges of air holes as shown at $b$, $b$, $b$, $c$, $c$, $c$, the lower series being arranged below the lower part of the solar cap and so as to allow air to pass into the interior of the said cap. The upper set of holes is arranged above the lower part of the solar cap and so that air may pass through them and circulate against the outside of the solar cap and pass up into a glass chimney when placed within and supported by the tube F, and made to extend above the solar cap and to hold such a chimney.

The wick tube plays freely in longitudinal directions within the solar cap and is operated by a rack $d$ and a pinion, $e$, the said pinion being fixed upon an arbor, $f$, carrying a milled head, $g$.

In the drawings, the wick C, is represented as formed in two parts, $h$, $i$, the part, $h$, being extended laterally through the lower part of the tube and made to depend therefrom or hang within the reservoir of the lamp. The other part or that marked, $i$, rests on the part, $h$, and fills the wick tube.

In the operation of my improved lamp, the consumption of the camphene or hydro carbon liquid may be said to be uniform or nearly so, at whatever distance the upper end of the wick tube may be from the discharging orifice of the solar cap, whereas, in an ordinary lamp should the wick be raised within the wick tube the consumption of the fluid would be increased. In the common solar lamp, the wick tube is stationary with respect to the solar cay, the wick being movable within its tube.

The object of the solar lamp and the movable wick tube, in my improved lamp is to cause the aerial cement which passes through the discharging orifice, $a$, of the solar cap and supplies the flame with the oxygen necessary to combustion on the upper end of the wick to be varied in its course or more or less bent in passing over the top of the wick tube in order to insure perfect combustion of the liquid material and thereby not only increase the illuminating power of the flame, but prevent the same from smoking. Should the flame smoke we may diminish the amount of smoke by elevating the wick tube. The same result could be accomplished were we to make the wick tube stationary and the solar cap adjustable or movable either upward or downward with respect to the wick tube holding a stationary wick.

Fig. 5, of the accompanying drawings, exhibits a vertical section of a lamp containing my invention and showing the construction of it in which the wick tube is stationary and the solar cap is made adjustable vertically with respect to such wick tube. Making either the wick tube adjustable with respect to the solar cap, or the solar cap adjustable with respect to the wick tube accomplishing like results and contains my improvement.

My invention, although simple accomplishes a very important result, as it enables camphene or various other hydro carbon liquids very rich in carbon to be burned without smoke, a desideratum long sought for, but seldom or never attained before the date of my invention to any such degree of practical advantage as is effected by my improvement.

I do not claim merely making a wick adjustable with respect to a solar cap, but claim, as my invention—

An improved lamp having its wick tube made adjustable and movable with respect to its solar cap, or having the latter made adjustable with respect to the wick tube, the whole being substantially in manner and so as to operate as herein before specified.

In testimony whereof I have hereunto set my signature.

E. J. HALE.

Witnesses:
AUGUSTUS HALE,
J. C. DEARBORN.